United States Patent [19]

Schwartz et al.

[11] Patent Number: 5,245,633
[45] Date of Patent: Sep. 14, 1993

[54] SYSTEM FOR TRANSMITTING DIGITAL DATA OVER AN ELECTRICITY POWER LINE

[75] Inventors: Hervé Schwartz, Vanves; Marc Muller, Clamart, both of France

[73] Assignee: Schlumberger Industries, Montrouge, France

[21] Appl. No.: 846,111

[22] Filed: Mar. 5, 1992

[30] Foreign Application Priority Data

Mar. 18, 1991 [FR] France ................. 91 03264

[51] Int. Cl.⁵ .............. H04L 27/08; H04B 7/10; H04B 1/10; H04B 1/18
[52] U.S. Cl. .................... 375/100; 375/98; 375/102; 455/283; 455/283
[58] Field of Search ............ 370/84; 375/100, 98, 375/103, 102; 455/277.2, 283

[56] References Cited

U.S. PATENT DOCUMENTS

| | | | |
|---|---|---|---|
| 4,479,215 | 10/1986 | Baker | 375/100 |
| 4,790,013 | 12/1988 | Kage | 375/115 |
| 4,815,106 | 3/1989 | Propp et al. | 375/103 |
| 4,843,615 | 6/1989 | Davis | 375/98 |
| 4,884,272 | 11/1989 | McConnell | 375/100 |

OTHER PUBLICATIONS

"Survey of Computer Communications Loop Network", Part 1 by B. K. Penney and A. A. Baghdade, Computer Communication, vol. 2, No. 4, Aug. 1979 Published by IPC Science & Technology Press.

Primary Examiner—Curtis Kuntz
Assistant Examiner—Vijay Shankar
Attorney, Agent, or Firm—Sanford J. Asman

[57] ABSTRACT

The invention relates to a communications system suitable for application directly to a national electricity grid and comprising a transmitter for transmitting data over a plurality of transmission frequency bands, a receiver for receiving messages over any one of the frequency bands, means for evaluating the transmission quality of each of the frequency bands, and a way to adapt the system for transmitting and receiving over the frequency band that has optimum transmission quality. The system of the invention may be applied, in particular, to remote reading of electricity meters.

10 Claims, 7 Drawing Sheets

SYSTEM FOR TRANSMITTING DIGITAL DATA OVER AN ELECTRICITY POWER LINE

The present invention relates to a system for transmitting digital data over a line of an electricity power network or grid, the system including transmission means suitable for transmitting data in a plurality of predetermined frequency bands, and receiver means suitable for receiving data in any one of said bands.

BACKGROUND OF THE INVENTION

The system of the invention is thus a member of the family of power line carrier transmission systems, and it may be applied, in particular, to concentrating and remotely reading electricity meter data, to remotely controlling a set of circuit breakers, to transmitting commands or information for automated homes, and more generally to automating an electricity power grid and the set of loads or members that are connected thereto.

Moreover, the invention is equally applicable to low tension networks, i.e. networks in which the voltage typically lies in the range 100 volts to 400 volts, and to medium tension networks, i.e. networks in which the tension typically lies in the range 3 kilovolts to 35 kilovolts, with the common characteristic being that the channel used for transmitting data is under all circumstances constituted by a line of a network or grid for distributing electricity.

The problems encountered in developing such carrier systems are numerous.

Firstly, transmission at relatively low frequencies, and in particular below 9 kHz, conflicts with the presence of harmonics of the fundamental frequency of the grid (generally 50 Hz or 60 Hz), which make it very difficult to detect the signals being transmitted.

In practice, transmission and low frequencies, and a fortiori, at very low frequencies, requires high power injectors to be used, and is thus necessarily expensive and very bulky.

Although transmission at high frequency makes it possible to escape from interference from the harmonics of the grid frequency and to reduce the size of the injectors considerably, it is impeded, in contrast, by other difficulties, namely both the possibly significant attenuation of the transmitted signal which depends on the number and the nature of the apparatus simultaneously connected to the electricity line, and the presence of impulse noise on the electricity line within the frequency band used for transmission.

For example, in most conventional systems, such impulse noise may, at least at some instants, cause the signal-to-noise ratio to pass below the minimum value for detecting the signal, which minimum value is generally around 5 dB.

Although it is known for all of these reasons to use spread-spectrum systems for transmitting data over electricity grids, and although such systems are perfectly satisfactory in some applications, all of them nevertheless present the drawback of being generally relatively complex and of permanently distributing energy over a very wide frequency band, and depending on circumstances, a large fraction of the very wide energy band will only be capable of providing a signal-to-noise ratio that is much too low to provide useful assistance in achieving successful transmission.

A system is known from U.S. Pat. No. 4,479,215 that complies with the preamble of the present description, i.e. that constitutes a carrier system using frequency modulation over a relatively narrow band selected from a set of predetermined frequency bands.

Although it is then possible, in theory, to concentrate all of the transmission energy in a band that is useful for transmission purposes, the use of such modulation itself gives rise to a new problem, namely that of selecting the band and of ensuring that both the transmitter and the receiver make use of it in coordinated manner.

In the prior art, this problem is resolved both in the context of carrier transmission over electricity lines, as described in U.S. Pat. No. 4,479,215, itself, and in the context of radio transmission (which is nevertheless marked by difficulties that are fundamentally different), as described in German patent DE 2,039,409, by basing coordination of the transmitter and of the receiver on a priori knowledge by both of them of the order in which the various frequency bands will be tried.

For example, according to U.S. Pat. No. 4,479,215, any new transmission is made on a predefined frequency band known to the transmitter and to the receiver, and if the transmitter fails to receive an acknowledgement from the receiver, it concludes that transmission has not worked; under which circumstances it sends a frequency skip instruction to all potential receivers thereof, requesting said receivers to monitor the arrival of a message on a second frequency band, likewise predefined and known in advance by the transmitter and by the receivers.

Although particular means are provided in U.S. Pat. No. 4,479,215 for increasing the probability that the receivers do indeed detect the frequency skip instruction, and are thus, in theory, informed that the band to be monitored has changed, three problems nevertheless remain associated with this mode of operation: firstly, the probability remains relatively high that a receiver may not detect the frequency skip signal under all transmission conditions; in addition, the probability of a receiver detecting an interference signal and interpreting it as a frequency skip signal is even higher; and finally and above all, the probability of a receiver detecting a message is exactly zero in each of the above two cases since the receiver is then necessarily set to a frequency band that is different from the band over which the message is being transmitted.

In this context, a specific object of the invention is to provide a line carrier communication system capable of adapting itself to data transmission over a plurality of frequency bands, but in which the adapting process does not rely on a priori knowledge by the transmitter and the receiver of the order in which the various frequency bands are to be tried, thereby avoiding the above-mentioned faults.

SUMMARY OF THE INVENTION

To this end, the data transmission system of the invention essentially includes the improvements whereby:

the transmitter means, at least when setting up a new call with the receiver means, transmit data over each of the frequency bands in the form of a message preceded by a synchronizing preamble; and the receiver means comprise: preprocessor means suitable for processing any signal received from any of the reception bands included within said predetermined frequency bands; adaptation means for selecting said reception band; synchronizing means suitable for finding a predetermined sequence contained in the synchronizing preamble; and evaluation means operating under the control of the synchronizing means to provide the adaptation means with a criterion for evaluating the transmission of data in any selected reception band; the adaptation means using said criterion to select and designate as the message reception band a reception band that offers adequate transmission quality.

In an advantageous embodiment of the system, the preprocessor means process the signal received in a single reception band at a time, and the adaptation means, so long as they do not receive a satisfactory evaluation criterion, periodically change the selected reception band with a periodicity that is not greater than the transmission duration of said preamble divided by the number of said predetermined frequency bands.

In a system of the invention and including at least one first and one second communication station each provided with transmitter means and receiver means, the effectiveness of data transmission from the first station to the second is further improved if the second station includes means for controlling its own transmission means for the purpose of transmitting an acknowledgement to the first station indicating which band it is using as the message-reception band.

For example, the second station may then transmit said acknowledgement to the first station using the band that it has selected for message-reception purposes.

The transmitter means integrated in the system of the invention preferably use continuous phase frequency shift keying (CPFSK).

The means for evaluating transmission quality, assuming they implement a Viterbi algorithm, build a phase lattice, advantageously including detection means that make use of pseudo-coherent type detection.

Under such circumstances, the detection means are preferably suitable for limiting the amount of data recorded in a memory dedicated to the Viterbi algorithm so as to eliminate possible detection problems due to a sudden change in phase.

The value of the modulation index h which determines the maximum number of states in the phase lattice is advantageously fixed at 0.75, and the CPFSK used is preferably quarternary keying.

Finally, in the event that the periodicity of data transmission is short relative to the length of periods of transmission channel stability, the transmitter means and the receiver means may be made suitable for storing the last frequency band designated for use as the reception band, and for using and monitoring said band on a priority basis for the following call.

BRIEF DESCRIPTION OF THE DRAWINGS

Embodiments of the invention are described by way of example with reference to the accompanying drawings, in which.

DETAILED DESCRIPTION

The general idea of the invention consists in using narrow band modulation and in adapting the frequency band to the transmission characteristics of the channel constituted by the electricity line.

Data is transmitted by CPFSK, i.e. by frequency shift keying with continuous phase variation, with the principle of such keying (i.e. modulation) consisting in encoding and transmitting data as the frequency of a sinewave signal whose phase varies continuously.

The CPFSK used in the system may be binary or quarternary, i.e. it may enable two-state symbols (or "bits") to be transmitted that are encoded by two different frequencies, or else it may enable four-state symbols to be transmitted, i.e. symbols encoded on four different frequencies.

Mathematically, such modulation can be expressed in the form:

$$s(t) = A.\cos[F(t) + G]$$

for t lying in the interval $[(n-1).T, n.T]$ where:

A = square root of $(2.E_s/T)$
$F(t) = 2.PI.f_c.t + Alpha_n.PI.h.(t-(n-1).T)/T$
$G = PI.h.\text{Sum}(Alpha_i$ for i varying from minus infinity to $n-1$) where s(t) represents the signal transmitted at any instant t; $f_c$ is the frequency of the transmitted sinewave signal; T is the constant duration of transmitted bits or symbols; $E_s$ is the energy of the transmitted symbol over is entire duration T; and where $Alpha_n$ is the value of the symbol, with $Alpha_n$ having values $-1$ and $+1$ for binary CPFSK, and values $-3$, $-1$, $+1$, and $+3$ for quarternary keying.

As shown by the above mathematical expression, the phase of the transmitted signal includes terms in $Alpha_i$ for i less than n, which terms relate to earlier symbols.

Although every symbol to be transmitted is encoded by the frequency of the signal that is transmitted, the phase of the signal depends on the preceding symbols.

According to the invention, detection is performed in a manner referred to herein as "pseudo-coherent", which is identical to well-known coherent detection and which provides the same performance, differing only in that it does not involve any phase-recovery operation.

In addition to being very simple to implement, such pseudo-coherent detection has the advantage of operating correctly even with a low signal-to-noise ratio, i.e. specifically when it is generally difficult to recover phase.

In addition, the selected modulation is characterized, as shown by the expression for s(t), by the choice of a modulation index h which represents the frequency deviation rate and which determines the difference between two frequencies.

For a given modulation index h and for a given number of phases (modulo 2.PI), the trajectory of possible phases at a given instant forms a lattice which is developed on a cylinder. If h can be written $h = p/q$, where p and q are mutually prime and where p is odd, the lattice then only contains 2.q different states, and subsequent states coincide with the first states after a rotation of the cylinder.

Each message which is constituted by a set of symbols is thus written in a lattice of this type.

Figure 1A:
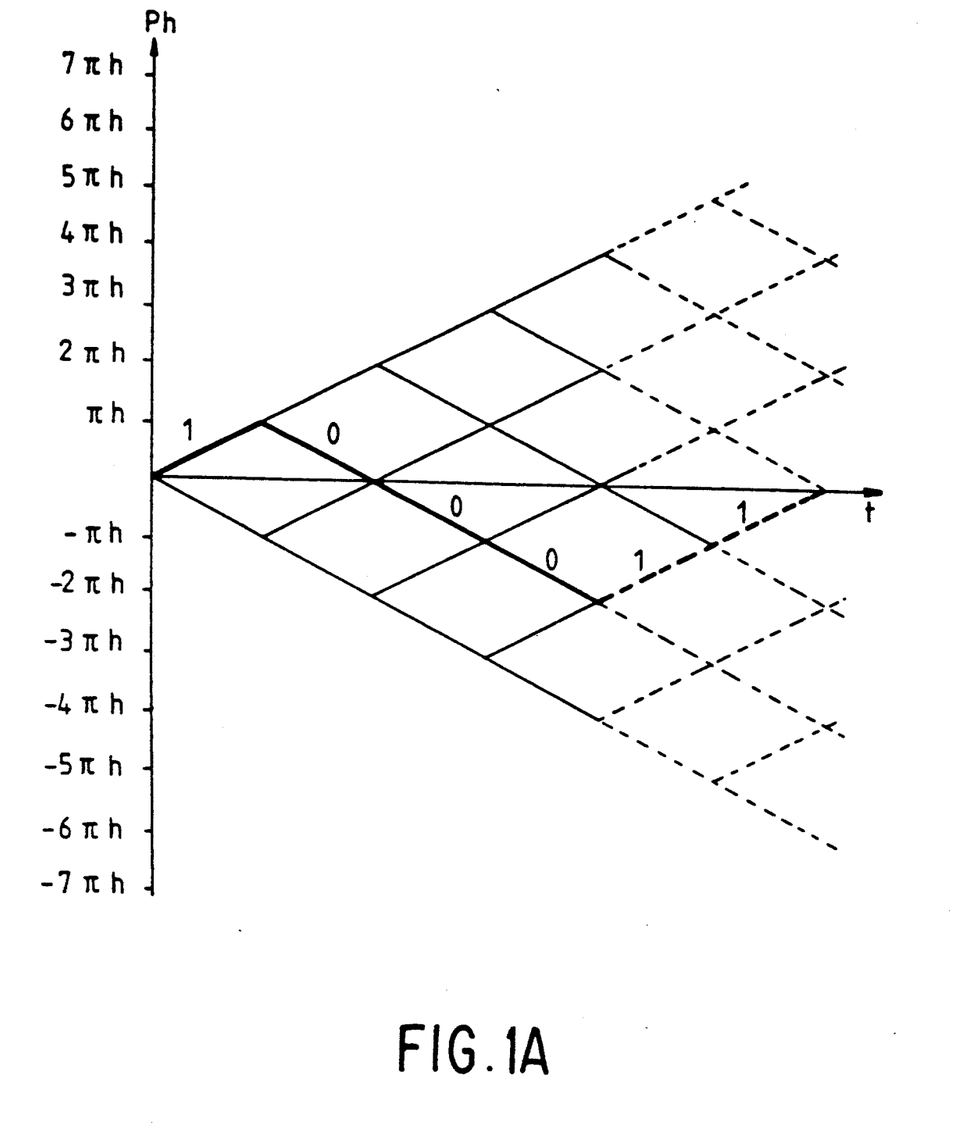
FIGS. 1A and 1B show phase lattices for binary and for quarternary CPFSK, respectively.

FIG. 1A shows the phase lattice and the appearance of the transmitted signal for binary CPFSK. The lattice is represented by a graph having time t plotted horizontally and having phase Ph plotted vertically as a function of the modulation index h.

Figure 1B:
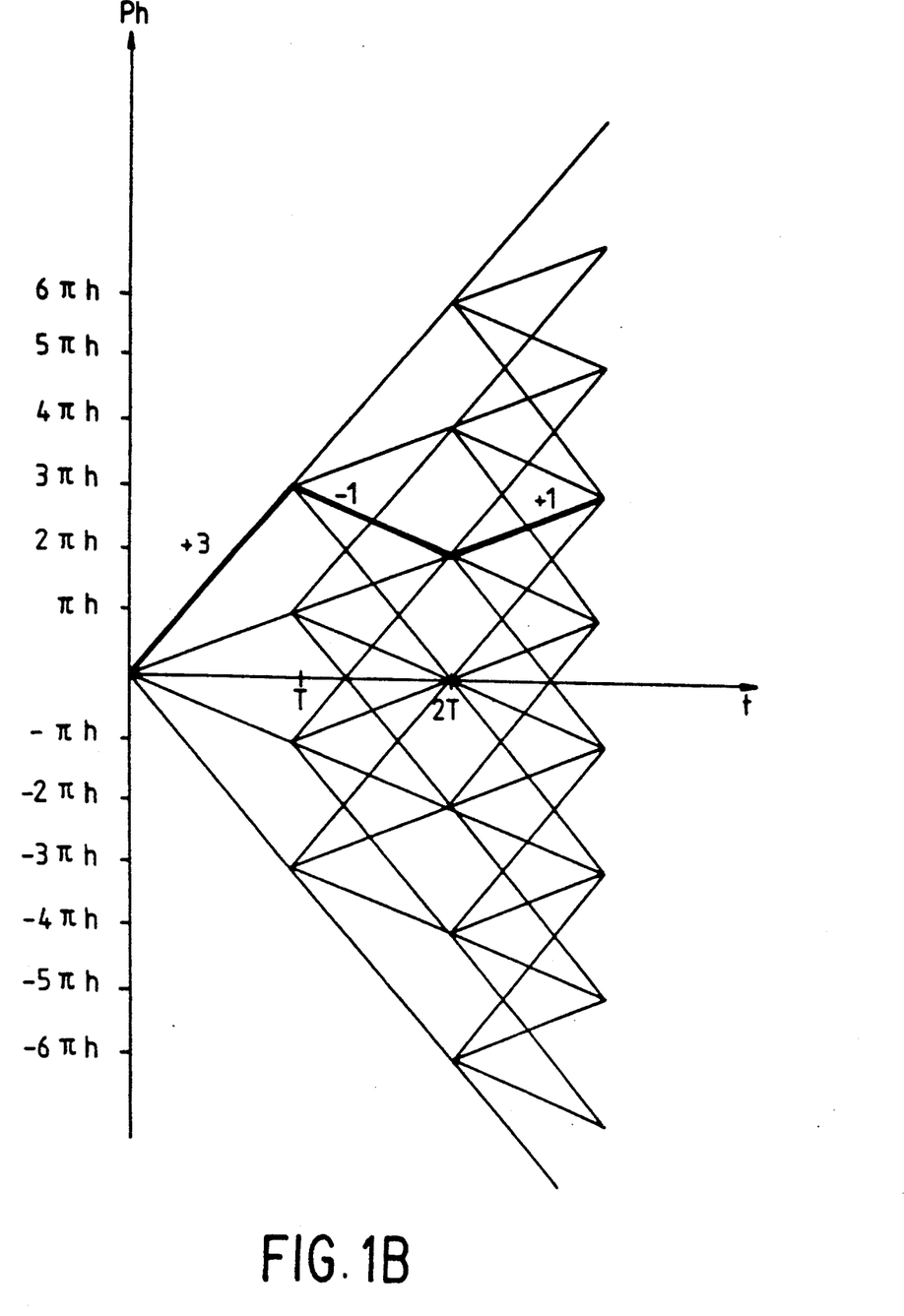

FIG. 1B shows another phase lattice obtained for quarternary CPFSK. On each symbol transition, four trajectories and thus four values for the following symbol are possible, a priori.

In fact, pseudo-coherent detection cannot be implemented without a special choice of parameters for the phase lattice, and more specifically for the modulation index h.

Although the modulation index h, may, a priori, take various different values, to obtain an optimum result it must satisfy various constraints, namely:

its value must be a rational number so as to give rise to a lattice having a finite number of states;

it must give rise to a lattice having a number of states that is large enough for the phase difference between the real phase trajectory and any possible trajectory to be small so that the quantity of energy lost in going from one another of two adjacent states is not too large; and it must provide high performance in terms of decision error probability, and in particular better performance than PSK.

A high performance value for the modulation index is $h=\frac{3}{4}$, for example, i.e. $h=0.75$, thus giving rise to a lattice that has eight states ($2.q=2\times 4=8$).

When h is not an integer, as is the case in the application described, detection relies not only on the state of the signal at a given instant, but also on earlier states of the signal.

The transmitted message is thus determined as a function of the trajectory of its phase, and detection, preferably performed by implementing the Viterbi algorithm, consists in retrieving the most probable phase trajectory from within the lattice.

The Viterbi algorithm is a recurrence procedure that is well known to the person skilled in the art and it serves to reduce to 2.q the number of phase trajectories that need to be taken into account out of all possible trajectories each of which represents a sequence of symbols from all possible sequences.

Thus, with reference to an eight-state lattice corresponding to a modulation index $h=\frac{3}{4}$, only eight trajectories are taken into account by the algorithm as having a non-zero probability of corresponding to the trajectory actually followed by the message.

These eight surviving trajectories, called "survivors" below, are stored in the system of the invention, and a structural description is given thereof with reference to FIG. 2.

Figure 2:
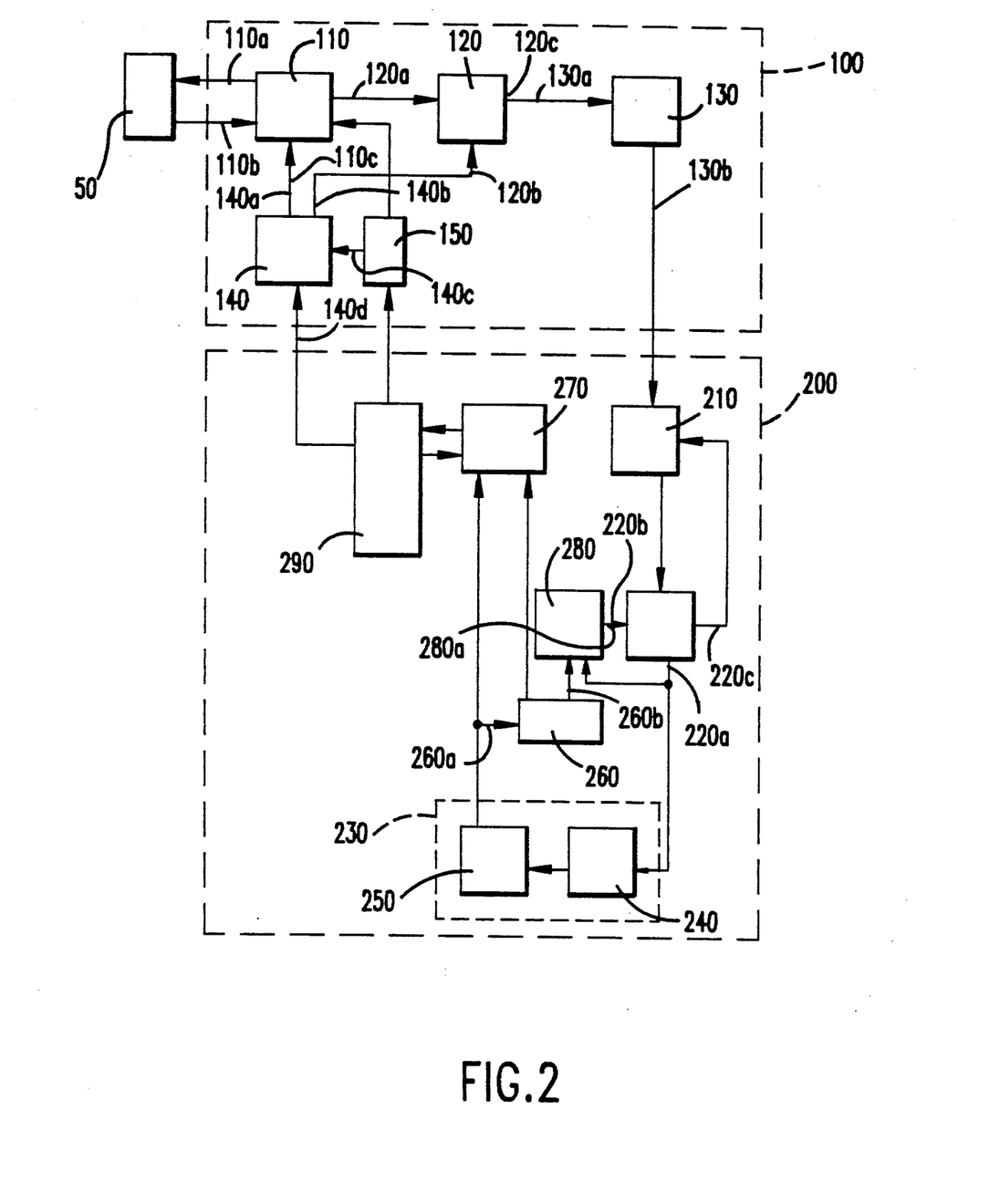
FIG. 2 is a unit diagram of the analog and the digital transmit/receive cards of the system.

On receiving each new symbol, the survivors are extended from the data available at the outputs of correlators 220 shown in FIG. 2.

More precisely, the outputs of these correlators make it possible to calculate a transition metric, i.e. to measure the probability of a transition between two phase states.

On the basis of these transition metrics, the Viterbi algorithm determines the probability of a trajectory and enables the most favorable survivor to be selected.

In the context of the invention, and in particular with pseudo-coherent detection, it turns out to be possible to improve reception by limiting the memory of the Viterbi algorithm, in other words by forgetting the past, either periodically, or else progressively.

Insofar as implementing the Viterbi algorithm introduces a memory effect, any sudden and untimely phase change disturbs detection for a certain length of time.

Forgetting the past thus makes it possible to reduce possible errors of this type and to limit possible losses of data, so that any accidental phase change then has an effect on a portion only of the phase trajectory.

In one possible embodiment, the past is forgotten progressively at the arrival of each new symbol by forgetting the oldest symbol in each survivor after taking it into account, i.e. as soon as the oldest symbol in each of the survivors has been decided on as a function of the metrics calculated for each of the survivors.

In another embodiment, the past is forgotten periodically. Under such circumstances, the detector compares the metrics of each survivor at the chosen instant for emptying the memory, and then determines all of the symbols of the most probable survivor.

To properly interpret the messages that are presented to it, the receiver must be capable firstly of finding the frequency band in which they are being transmitted, secondly of finding the starting instant of each symbol, and finally of finding the starting instant of the useful message that is addressed thereto.

In accordance with the invention, all this is achieved simply, both by a special combination of receiver functions and by the fact that each message is preceded by a synchronizing preamble which contains a predetermined sequence to enable the receiver to find the starting instant of each symbol, generally referred to as the symbol timing.

FIG. 2 is a unit diagram of the analog and digital cards 100 and 200 respectively for the transmitter and the receiver in the system of the invention.

The coupling and protection unit 110 which is a feature of all line carrier systems establishes a physical link between the transmission system and a line 50 of the electricity power network.

More precisely, the coupling and protection unit 110 has the function on reception of transforming all signals received from the line 50 on input 110b into signals that can be used by the system, and on transmission of transforming any signal generated by the system into a signal passing via its output 110a and suitable for travelling over the line 50.

A preprocessor unit 120 serves to preprocess any signal it receives on its input 120a from the coupling unit, with such preprocessing consisting in filtering the signal and in translating its frequency about an intermediate frequency using a translation frequency signal received on an input 120b, and also in amplifying the received signal.

The signal available at the output 120c of the preprocessor unit 120 is delivered to the input 130a of an analog-to-digital converter (ADC) 130 and the digital samples available at the output 130b of the converter are applied to the digital card 200.

For transmission, the signal generator 140 transmits a signal to be transmitted via its output 140a to the input 110c of the coupling and protection unit 110. On reception, the generator 140 transmits the signal at the appropriate translation frequency on its output 140b to the input 120b of the preprocessor unit 120. The operating mode of the generator 140 is selected by a switch 150 which is in turn controlled by a communications controller 290 which also controls the operating mode of the coupling unit 110.

The digital samples from the ADC 130 are stored in random access memory (RAM) 210 prior to being filtered around two transmission frequencies F0 and F1 for a binary CPFSK application (and about four frequencies for a quarternary application), under the action of a bank of four (or eight as the case may be) correlators 220.

On the basis of these four (or eight) correlated values of F0 and F1, the symbol decision unit 230 which implements the Viterbi algorithm uses a computer 240 to calculate the sixteen transition metrics (or thirty-two for a quarternary application) whose function is explained in greater detail above.

The metrics coming from the computer 240 are applied to the survivor controller 250 which delivers at its output the symbols that result from its decision-making, which symbols are applied to the error corrector 270 and to the frame synchronizing unit 260 for synchronizing the receiver station on the received data.

The error corrector 270 implements any known algorithm for detecting and correcting errors that is suitable for determining whether possible transmission errors can or cannot be corrected, and for correcting them if they can.

The error corrector 270 is controlled by the communications controller 290 which activates the error detection and correction algorithm or does not activate it and which indicates the expected message length to the error corrector.

In non-active mode, the corrector 270 transmits the detected message to the communications controller 290 without correction and having the indicated length. In active mode, it transmits the corrected message to the communications controller 290 or it informs it that the message cannot be corrected, with the corrector thus participating in evaluating transmission.

The frame synchronizing unit 260 receives decided symbols via its input 260a, it stores them in a shift register, and initially it correlates them with the symbols of a predetermined sequence for recovering timing (e.g. 101010) that should be contained in the preamble transmitted by the transmitter. When correlation exceeds a certain threshold, it applies a signal on its output 260b for application to the symbol synchronizing unit 280 to indicate that timing has been successfully recovered, i.e. that the starting instants of the received symbols have been determined.

After such timing recovery, the synchronizing unit 260 correlates the decided symbols with the symbols of a second predetermined synchronizing sequence, that should also be contained in the preamble, and that is used for defining the beginning of the useful part of the message, which sequence is referred to as the "frame synchronizing" sequence. As soon as this correlator exceeds a certain threshold (with the extent by which the threshold is exceeded being indicative of reception quality), a signal indicating success and indicating the quality of frame recovery is applied to the corrector 270 via the output 260c of the frame synchronizing unit 260.

By producing this signal which thus constitutes the criterion for evaluating transmission that is actually made use of by the controller 290 the frame synchronizing unit 260 takes on a function of evaluating transmission, in addition to its primary synchronizing function.

The symbol synchronizing unit 280 uses the output 220a of the correlators 220 for each received symbol to calculate the timing error which it communicates via its output 280a to the input 220b of the correlator 220.

As a function of this error, the correlators 220 can thus adapt the address of the data they request from the memory 210 via their outputs 220c.

In transmission mode, the communications controller 290 formats the messages to be transmitted by encoding them if they are useful messages and by preceding them with synchronizing preambles comprising both the symbol synchronizing sequence and the frame synchronizing sequence.

The communications controller 290 then selects the two (or four in a quarternary application) frequencies for representing data and it applies a sequence to the input 140d of the generator 140 specifying the message to be transmitted.

Several different interchange protocols can be used for transmitting messages, with such protocols being installed in the communications controller 290.

In the context of the present invention, the terms "protocol" and in particular "adaptive protocol" designate the set of messages that are interchanged between a transmitter and a receiver for the purpose of achieving transmission of a useful message.

According to the invention, the transmission channel between the transmitter and the receiver is split up into a plurality of frequency bands.

Each transmitter/receiver station has at least two frequency bands available to it, and the receiver station is required during a stage that makes use of its adaptive properties to find the frequency band that has been selected by the transmitter station for transmitting messages.

More precisely, in each of the stations involved in a transmission, the requirement is to discover and then to use the best frequency band from all of the bands that are available a priori, or at least to discover and then to use a frequency band that is usable, i.e. that gives rise to an error rate that is low enough for errors to be correctable by the error corrector 270.

Several different protocols for interchanging messages between the transmitter and the receiver can be used for determining which frequency band is to be designated for transmitting useful data, i.e. which band enables messages to be transmitted correctly.

Figure 3A:
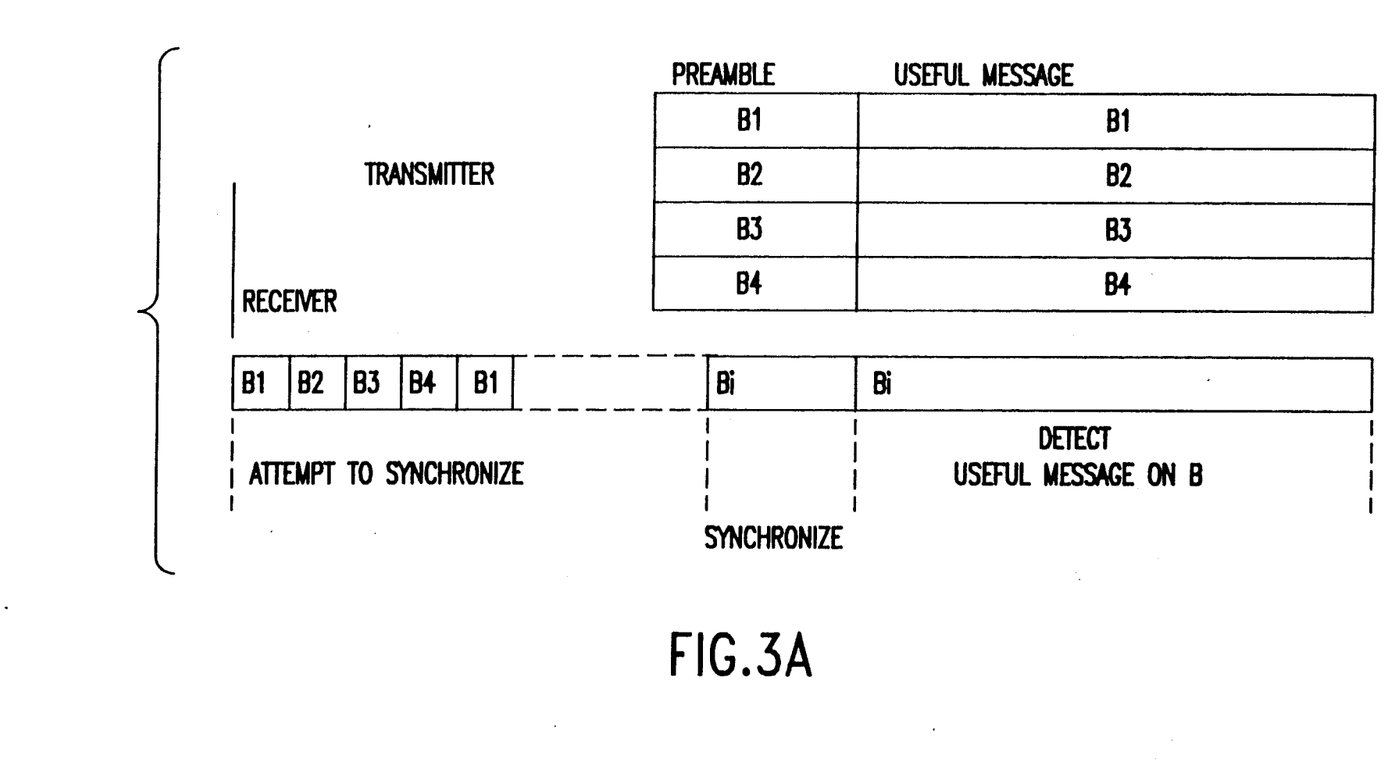
FIGS. 3A, 3B, 3C, and 3D show data interchanges between a first station and a second station using first, second, third, and fourth protocols, respectively.

FIG. 3A shows an interchange of data between the transmitter and the receiver in accordance with a first protocol. The transmitter E sends the same preamble simultaneously on each of the bands in a set comprising a plurality of predetermined frequency bands, e.g. four bands B1, B2, B3, and B4. The receiver R permanently attempts to synchronize itself on the various different frequency bands which it selects one after another, and finally manages to synchronize itself on one of them while the preamble is being transmitted. When transmission of the preamble has terminated, the transmitter sends the useful message simultaneously on each of the frequency bands following on from the preamble, with the receiver then detecting the useful message on the frequency band on which it managed to synchronize itself.

For transmission on four different frequency bands, with a raw binary rate of 1000 bits/s and with a useful message length of 640 bits, this protocol makes it possible to obtain a net binary rate of 925 bits/s, which is an excellent result. Unfortunately, this protocol requires the available transmission energy to be shared over different transmission bands, so its major advantages are its transmission quality and the way it reduces the raw bit rate very little.

Figure 3B:
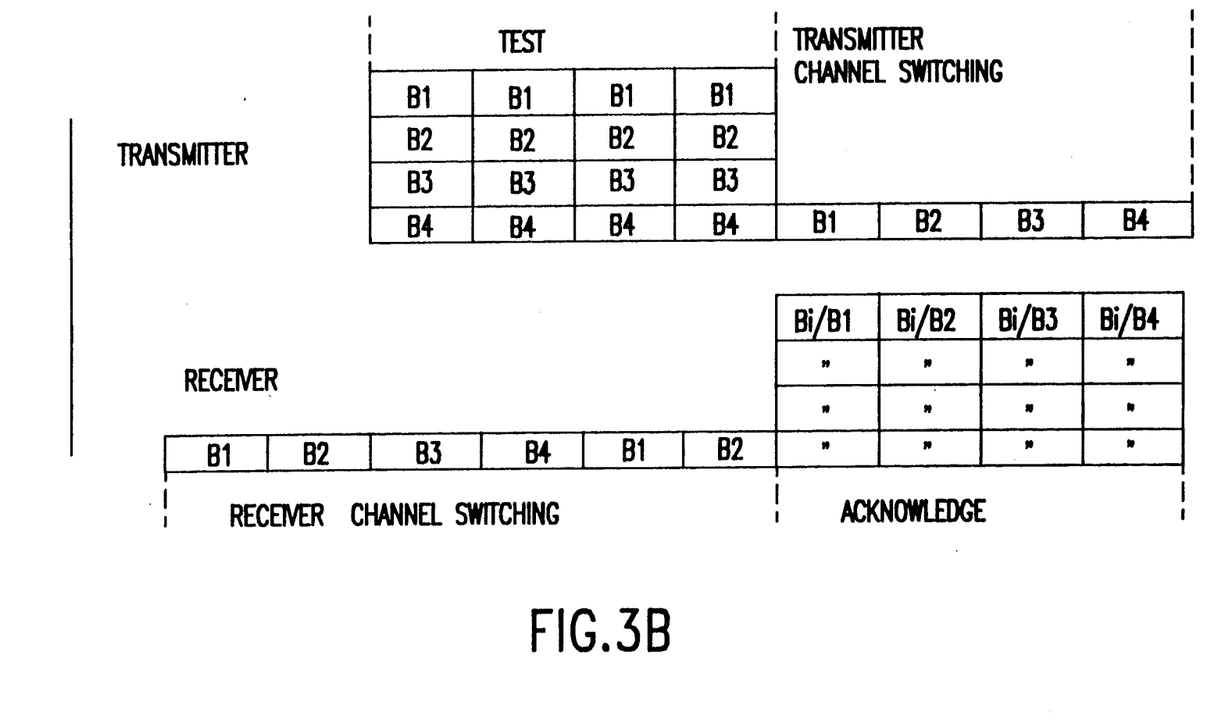

FIG. 3B shows information being interchanged in accordance with a second protocol. The transmitter transmits the same test message simultaneously over each of the frequencies bands B1, B2, B3, and B4, and it repeats this transmission as many times as there are bands so as to give the receiver the chance to adapt to each of the bands in turn, to evaluate transmission quality for each of them, and to give each of them a corresponding quality "score", with the score being zero for a band where no test message was received, and otherwise taking on the following value:

Quality score = Acceptable number of errors − Number of errors detected during the predetermined test message Using this quality score as a criterion for evaluating transmission, the receiver selects the band with the best quality score and communicates the "number" $B_i$ to the transmitter by sending an acknowledgement specifying the number of the selected band simultaneously over all of the frequency bands. The transmitter can then "listen" successively to the various different transmission bands and discover which frequency band is being designated by the receiver.

For initial parameters that are identical to those of the first protocol, this protocol makes it possible to achieve a net bit rate of 600 bits/s and has the advantage of transmitting with the best possible quality since the best transmission band is selected.

Figure 3C:
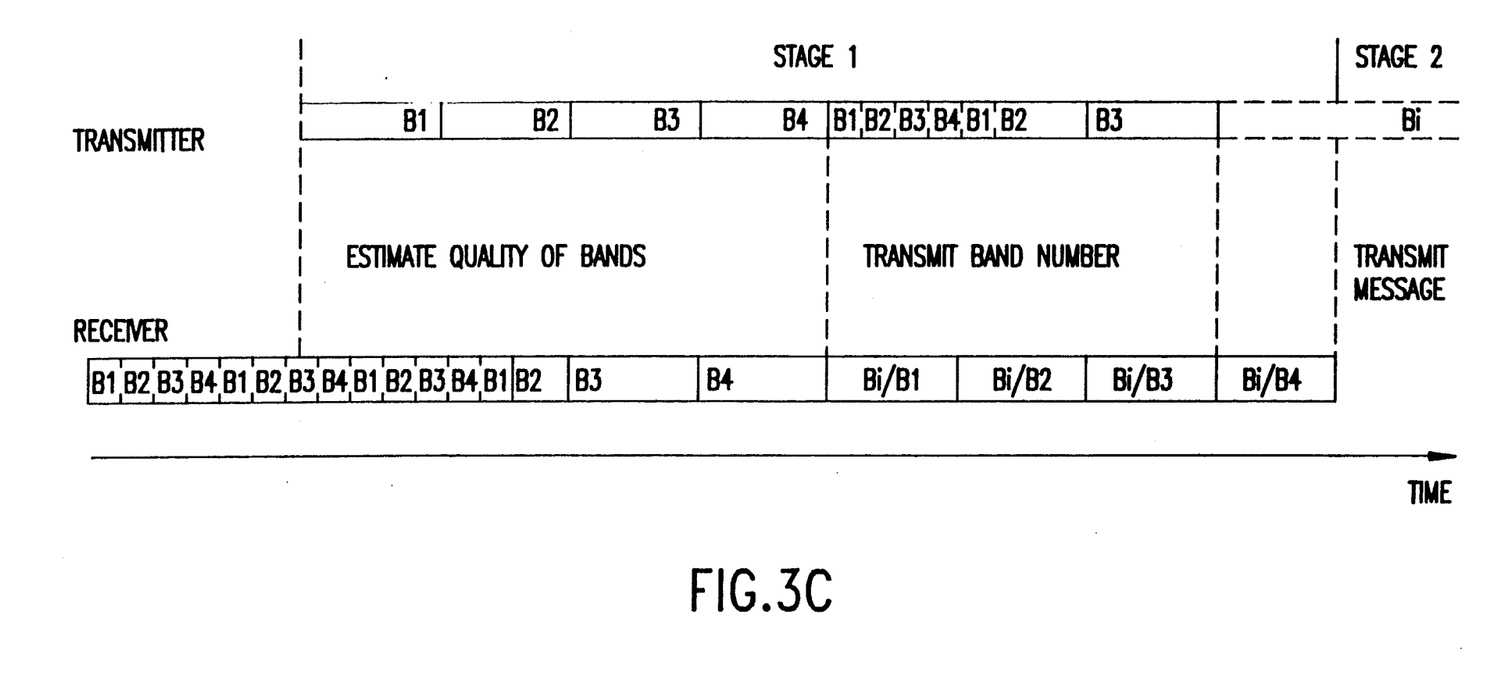

FIG. 3C shows an interchange between the transmitter E and the receiver R using a third interchange protocol which again uses test messages for determining the optimum frequency band. In the example shown in the figure, the band B1 is assumed to be of very poor quality, the band B2 a little better, the band B4 of good quality, and the band B3 excellent. The transmitter E sends the same test message successively over each of the frequency bands Bj. The receiver R observes each of the bands in succession and attempts to detect the test message (test Bj), and to keep a count of any transmission errors.

After each frequency band has been observed, the receiver R attributes a quality score to each of them, with failure to receive the test message on a band giving rise to it being given a zero score. The quality score is used as the transmission criterion, and the frequency band that receives the best quality score is selected. The receiver then sends an acknowledgement over each of the bands Bj specifying the number of the band it is designating for the remainder of the transmission.

Since the receiver R observes only one band at a time, each test message is transmitted as many times as there are bands, or else the symbol synchronizing preamble is lengthened by a factor equal to the number of bands, so as to ensure that the receiver does indeed have the chance to observe each of the bands in turn. Once the transmitter E has received the data specifying the designated band from the receiver R, it then sends useful messages to the receiver R which detects them and interprets them.

For each new transmission, the process is begun again.

Thus, for an application using four frequency bands B1, B2, B3, and B4, four test messages (test B1, test B2, test B3, test B4) must be transmitted on each of the four bands, such that the transmission is thus repeated sixteen times. The receiver R observes the four bands in succession and it returns on each of them data Bi indicating the band it is designating, with the useful message then being transmitted over said band.

Although the efficiency of this interchange protocol is limited since highly dependent on the length of the test messages, it has the advantage of being relatively simple. With the same initial parameters as in the two preceding protocols, its net bit rate is 410 bits per second.

Figure 3D:
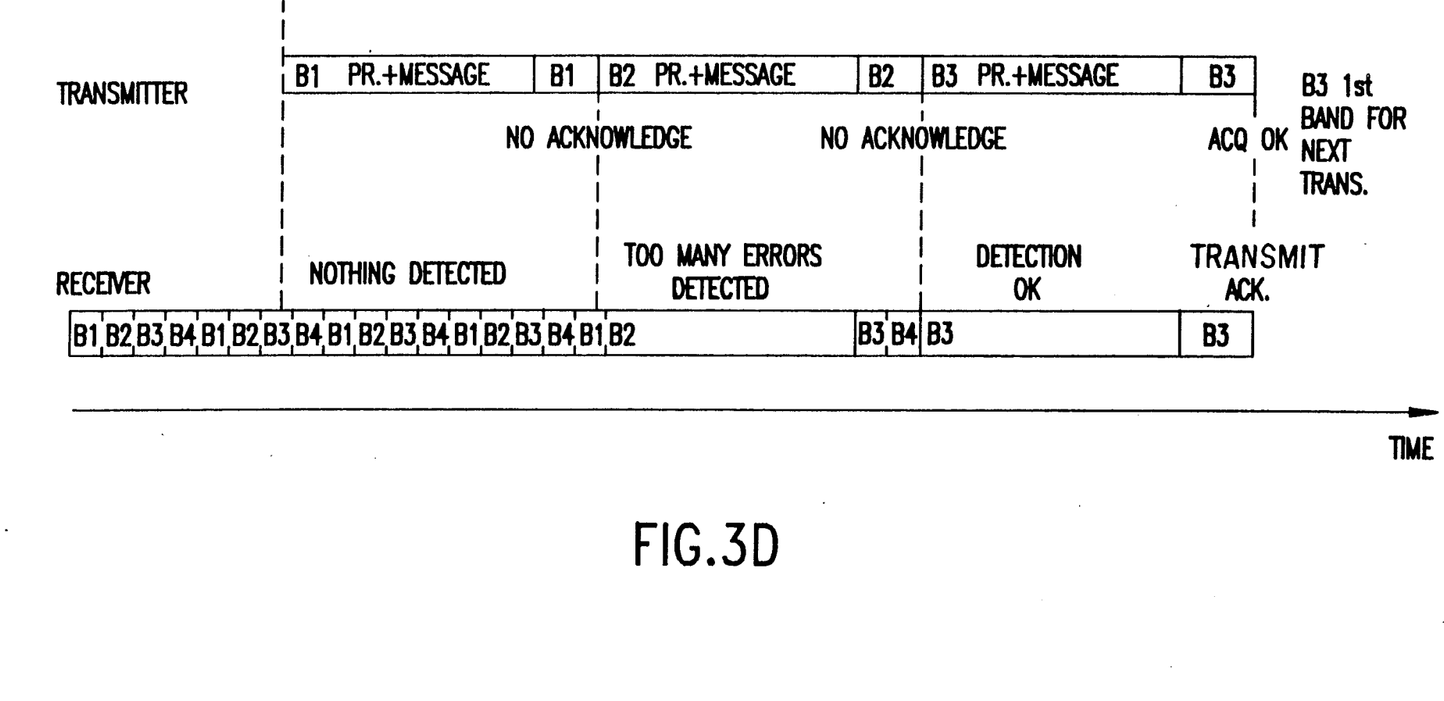

FIG. 3D shows a fourth interchange protocol capable of determining, if not the best frequency band, at least an acceptable transmission band, with the bands B1, B2, B3, and B4 being assumed to be of the same qualities as given for the example of FIG. 3C.

This protocol takes full advantage of the fact that to ensure that a message is transmitted correctly, it suffices for the receiver to be synchronized on the received message and for possible errors that may affect the useful message to be at a level that remains correctable.

The transmitter E sends the useful message to the receiver R preceded by its synchronizing preamble, firstly on any one of the frequency bands, and then in succession on each of the other frequency bands. As soon as the receiver R detects the useful message in satisfactory manner on one of the bands, it immediately returns an acknowledgement to the transmitter over the same band identifying the designated reception band.

This protocol has the advantage of being very simple to implement. Further, it can be improved to significantly increase the communications bit rate that it makes possible by storing, at least in the transmitter, the number of the band designated by the receiver and by giving priority to using said band for subsequent transmissions, which then makes it possible during such transmissions and providing transmission conditions have not changed, to save the time required for finding a satisfactory transmission band. Thus, for an application that uses four frequency bands, the time required to find the appropriate band varies from the length of the preamble plus the useful message, plus the acknowledgement, to four times said length.

Thus, even if the time required to find a suitable band is longer with this protocol than with the others, a considerable amount of time is saved because of the order of preference given to the different bands for subsequent transmissions.

This protocol thus makes it possible to achieve a net bit rate lying in the range 870 bits per second to 217 bits per second.

In accordance with the invention, it is possible, for example, to transmit a message by using frequency bands lying in the range 9 kHz to 95 kHz and spaced apart, for example, at a pitch of 38 Hz.

We claim:

1. A system for transmitting digital data over a line in an electricity power network, the system comprising transmitter means suitable for transmitting data over a plurality of predetermined frequency bands, and receiver means suitable for receiving data on any of said bands, wherein the transmitter means, at least when setting up a new call with the receiver means, is adapted to transmit data in the form of a message preceded by a synchronizing preamble and to commence transmission of the synchronizing preamble over each of the frequency bands; and wherein the receiver means comprise: preprocessor means arranged to receive and process any signal transmitted on any of the reception bands included within said predetermined frequency bands in particular to receive and process the synchronizing preamble over whichever band or bands are used by the transmitter; synchronizing means connected to said preprocessor means to detect a predetermined sequence contained in the synchronizing preamble; adaptation means for selecting a message reception band out of any of the bands; and evaluation means operating under the control of the synchronizing means to provide the adaptation means with a criterion for evaluating the transmission of data in any selected reception band; the adaptation means using said criterion to select and designate as the message reception band a reception band that offers adequate transmission quality.

2. A system according to claim 1, wherein the preprocessor means process the signal received in a single reception band at a time, and wherein the adaptation means, so long as they do not receive a satisfactory evaluation criterion, periodically change the selected reception band with a periodicity that is not greater than the transmission duration of said preamble divided by the number of said predetermined frequency bands.

3. A system according to claim 1, including at least a first communications station provided at least with said transmission means, and at least a second communications station provided with at least said receiver means, wherein said second station also includes transmitter means, and means for controlling the transmitter means to transmit an acknowledgement to the first station specifying which band has been designated as the message reception band.

4. A system according to claim 3, wherein the second station uses the band designated as the message reception band for transmitting said acknowledgement to the first station.

5. A system according to claim 1, wherein the transmitter means include means for performing continuous phase frequency shift keying.

6. A system according to claim 1, implementing a Viterbi algorithm constructed on a phase lattice, the system being wherein the means for evaluating transmission quality further include detector means using pseudo-coherent type detection.

7. A system according to claim 6, wherein said detector means are suitable for limiting the amount of data stored in a memory dedicated to the Viterbi algorithm so as to eliminate possible detection problems due to a sudden change in phase.

8. A system according to claim 7, in which the detector means use a modulation index h that determines a maximum number of states in the phase lattice, wherein the value of said modulation index h is fixed at 0.75.

9. A system according to claim 5, wherein the CPFSK is quarternary keying.

10. A system according to claim 1, wherein at least the transmitter means are suitable for storing the most recent frequency band to be designated as the reception band, and for giving priority to said band for the following call to the receiver means.

* * * * *